(12) United States Patent
Han et al.

(10) Patent No.: US 9,607,615 B2
(45) Date of Patent: Mar. 28, 2017

(54) CLASSIFYING SPOKEN CONTENT IN A TELECONFERENCE

(71) Applicant: International Business Machines Corporation, Armonk, NY (US)

(72) Inventors: Yan Feng Han, Ningbo (CN); Peng Jiang, Beijing (CN); Wen Hao Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 14/590,016

(22) Filed: Jan. 6, 2015

(65) Prior Publication Data
US 2015/0199962 A1 Jul. 16, 2015

(30) Foreign Application Priority Data
Jan. 13, 2014 (CN) .......................... 2014 1 0014212

(51) Int. Cl.
H04N 7/14 (2006.01)
G10L 15/08 (2006.01)
H04M 3/56 (2006.01)

(52) U.S. Cl.
CPC ............. *G10L 15/08* (2013.01); *H04M 3/568* (2013.01)

(58) Field of Classification Search
CPC ...... G06F 3/04842; G06Q 50/01; H04L 51/16
See application file for complete search history.

(56) References Cited

U.S. PATENT DOCUMENTS

| 7,870,494 B2 | 1/2011 | Lentz | |
| 8,295,462 B2* | 10/2012 | Miller | H04M 3/42153 348/14.08 |
| 8,731,935 B2* | 5/2014 | Chavez | H04M 3/2281 704/231 |
| 2011/0060591 A1 | 3/2011 | Chanvez et al. | |
| 2011/0125501 A1* | 5/2011 | Holtel | G10L 15/22 704/251 |
| 2012/0053936 A1 | 3/2012 | Marvit | |

(Continued)

OTHER PUBLICATIONS

Han et al., China Patent Application 201410014212.5 (English Translation), "Method and Apparatus for Classifying a Spoken Content in a Teleconference", filed Jan. 13, 2014.

*Primary Examiner* — David Hudspeth
*Assistant Examiner* — Shreyans Patel
(74) *Attorney, Agent, or Firm* — Steven F. McDaniel

(57) ABSTRACT

A method and an apparatus for classifying spoken content in a teleconference for a follower of the teleconference is disclosed. The method comprises: detecting a topic to which the spoken content belongs; determining a (overall) correlation degree between the follower and the spoken content at least according to a correlation degree between the follower and the topic; and classifying the spoken content according to the (overall) correlation degree between the follower and the spoken content. With the method and the apparatus, the correlation degree between the spoken content in the teleconference and the follower of the teleconference can be determined automatically, and the spoken content can be classified according to the correlation degree, so that the follower can selectively pay attention to some spoken contents during the teleconference, which reduces a burden of the follower and improves conference efficiency.

12 Claims, 2 Drawing Sheets

(56) References Cited

U.S. PATENT DOCUMENTS

| | | | | |
|---|---|---|---|---|
| 2012/0224021 A1* | 9/2012 | Begeja | ................... | H04N 7/147 348/14.08 |
| 2012/0323575 A1* | 12/2012 | Gibbon | .................. | G11B 27/28 704/246 |
| 2013/0091021 A1* | 4/2013 | Maslov | .............. | G06Q 30/0251 705/14.69 |

* cited by examiner

```
[Test status and problems of product A] Jan (55%): We will begin to discuss the test on product A.
Mark, could you give us some new information?                    08:00:08 AM

[Test status and problems of product A] Mark (80%): Ok, 50% of the test cases have passed,
and one problem with a number of 12323 was found.                08:00:15 AM

[Test status and problems of product A] Scott (45%): I will solve it.    08:00:50 AM

[Problems on environment] Kerry (50%): I will update the test environment of product A. Please
pause the test until tomorrow.                                   08:01:10 AM

[Problem on environment] Mark (80%): OK.                         08:01:20 AM

[Test status and problems of product B] Jan (35%): Next, we will discuss the test on product B. Tom, how
about the progress?                                              08:08:50 AM

[Test status and problems of product B] Tom (30%): The test proceeds as scheduled. 80% has been
completed, and one problem was found.                            08:07:50 AM

[Test status and problems of product B] Jan (35%): Well done.    08:08:20 AM

[Test status and problems of product B] Jan (30%): The meeting is over. Thank you.
                                                                 08:29:00 AM
```

FIG. 3

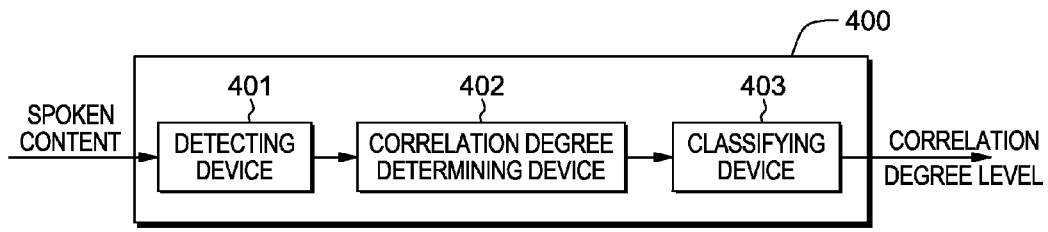

FIG. 4

CLASSIFYING SPOKEN CONTENT IN A TELECONFERENCE

RELATED APPLICATIONS

This application claims priority to Application No. 201410014212.5 to China filed on 13 Jan. 2014. The foregoing application is incorporated herein by reference.

BACKGROUND

The present invention generally relates to a teleconference, and specifically, to a method and an apparatus for classifying spoken content in a teleconference for a follower of the teleconference.

A teleconference has been widely applied in various fields in recent years. When the teleconference is held, participants located at different places log into a teleconference system and discuss a topic preset for the teleconference. Compared with a traditional face-to-face meeting, the teleconference does not require the participants to travel to a same conference place, and thus can save time and costs.

However, the teleconference also has its problem. Specifically, many different topics may often be discussed in the teleconference, and many persons may speak for each of the topics. Therefore, a great amount of spoken contents will be generated during the teleconference. For a certain participant, those spoken contents may be relevant or irrelevant to him. However, the participant typically has to listen to all the spoken contents during the conference to avoid missing important information, which places a heavy burden on the participant, especially when the teleconference lasts for a long time.

On the other hand, there may be someone who is very concerned about a teleconference but cannot attend the teleconference or has to quit the teleconference for some reasons. Under such a circumstance, although contents of the teleconference can be recorded by a voice recording so that he can learn the contents of the teleconference later, he has to listen to all the spoken contents during the teleconference, which brings a heavy burden.

SUMMARY

As disclosed herein, a method for classifying spoken content in a teleconference for a follower of the teleconference includes detecting a topic to which the spoken content belongs, determining a correlation degree between the follower and the topic to provide a topic correlation degree, determining a correlation degree between the topic and the spoken content to provide a speaker correlation degree, and classifying the spoken content according to the topic correlation degree and the speaker correlation degree. A corresponding apparatus, system, and computer program product are also disclosed herein.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 3 shows an exemplary diagram of classifying and displaying spoken contents occurring during a teleconference according to an embodiment of the present invention and;

FIG. 4 shows a block diagram of an apparatus for classifying a spoken content in a teleconference for a follower of the teleconference according to an embodiment of the present invention.

DETAILED DESCRIPTION

Figure 1:
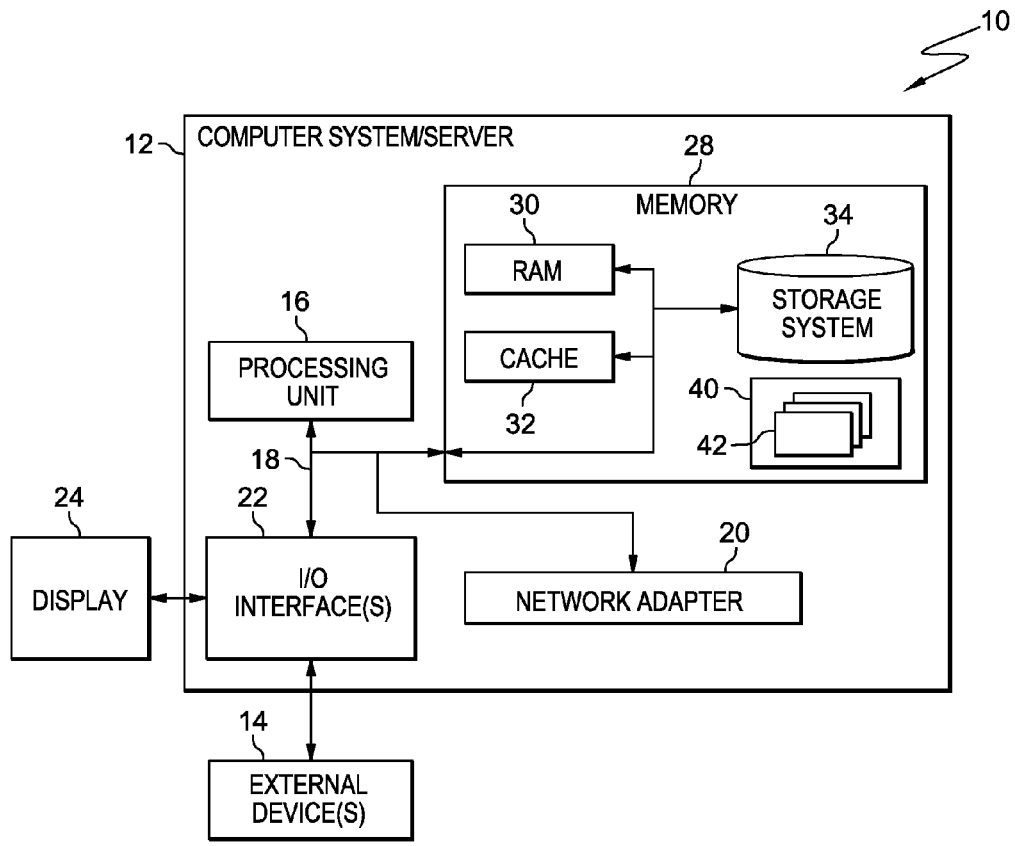
FIG. 1 shows a block diagram of an exemplary computing environment which is applicable to implement the embodiments of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As disclosed herein, a method and an apparatus for classifying spoken content in a teleconference for a follower of the teleconference (such as a participant of the teleconference or any other person who is interested in the teleconference) automatically classifies spoken content according to a correlation degree between the spoken content and the follower, so that the follower can learn the correlation between him and the spoken content, and can follow only the content relevant to him, which reduces a burden on the follower and improves conference efficiency.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 operating in a computing system 10 which is applicable to implement the embodiments of the present invention is shown. Computing system 10 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, and an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Hereinafter, a method and an apparatus for classifying spoken content in a teleconference for a follower of the teleconference according to embodiments of invention are described with reference to attached drawings. The follower of the teleconference may be a participant of the teleconference or any other person who is interested in the teleconference.

As described above, the teleconference is held through a teleconference system which may include a teleconference server and terminals (such as telephones, computers or the like, connected to the teleconference server) used by participants or relevant persons. One or more topics to be discussed during the teleconference can be preset, such as a R&D plan or sales status of a product, etc. The topics can be preset by a sponsor of the teleconference directly in the teleconference server, or can be preset into the teleconference server by a participant of the teleconference through his terminal. In addition, a list of the participants of the teleconference can be preset in the teleconference system. When the time for holding the teleconference occurs, the participants located at one or more places can log into the teleconference server through their terminals. For example, a participant can log into the teleconference server by inputting an access code uniquely assigned to him or his ID and password on his terminal. In this way, the participant logging into the teleconference server can be identified through the access code or the ID.

During the teleconference, a participant of the teleconference can make a speech under a topic relevant to him and listen to spoken contents of other participants. For example, the participant can input his spoken content into the teleconference server or receive the spoken contents from other participants through his terminal. In the embodiments of the present invention, the spoken contents during the teleconference can be classified according to correlation degrees between the spoken contents and the follower of the teleconference, so that the follower can learn the correlation between these spoken contents and him, and thus can selectively follow the spoken contents.

In the embodiments of the invention, voice samples and properties of all persons who might use the teleconference system, e.g. all participants of a current teleconference and other teleconferences held through the teleconference system, and other persons who might be interested in the teleconference can be stored in advance in a database in association with each other, and the teleconference system can access the database if necessary to extract a voice sample and a property of a person. For example, in a case that the teleconference system is used by one or more companies, voice samples and properties of all employees of the one or more companies can be stored in the database. In other embodiments, the voice samples and the properties of the participants of the teleconference and other persons who are interested in the teleconference (hereinafter referred to as interested persons for ease of description) can be stored in the database for use by the teleconference system before each teleconference is held.

As described later, the stored voice samples can be used for voice recognition for identifying a speaker in the teleconference. In addition, the stored properties of the participant or the interested person may include, for example, but not limited to, properties related to his personal identity (hereinafter referred to as identify properties) and/or properties related to his job duty (hereinafter referred to as job properties), etc. The identity properties may include, for example, a property "company" representing a company to which the participant or the interested person belongs, a property "department" representing a department (such as a human resource department, a R&D department, etc.) to which the participant or the interested person belongs, and a property "job position" representing a job position (such as a general manager, a department manager, a project manager, a development engineer, a test engineer, etc.) of the participant or the interested person, etc. The job properties can include, for example, a property "project in charge" representing a project of which the participant or the interested person is in charge, a property "participated project" representing a project which the participant or the interested person participates in, and/or a property "task" representing a specific job content of the participant or the interested person, etc. Besides the identity properties and the job properties, the properties of the participant or the interested person may include properties representing an interest of the participant or the interested person so as to indicate which kind of topics (e.g., topics irrelevant to the job duty of the participant or the interested person) the participant or the interested person is interested in. It is to be noted that, the various properties listed above are exemplary only, not limitative, and if necessary, one or more other properties of the participant or the interested person can be added, or one or more of the above properties can be replaced or removed.

Hereinafter, a method for classifying spoken content in a teleconference for a follower of the teleconference according to an embodiment of the present invention will be described with reference to FIG. 2. When the teleconference begins, it can be detected whether there is a person making a speech. If it is detected that there is a person making a speech, the method can be executed.

Figure 2:
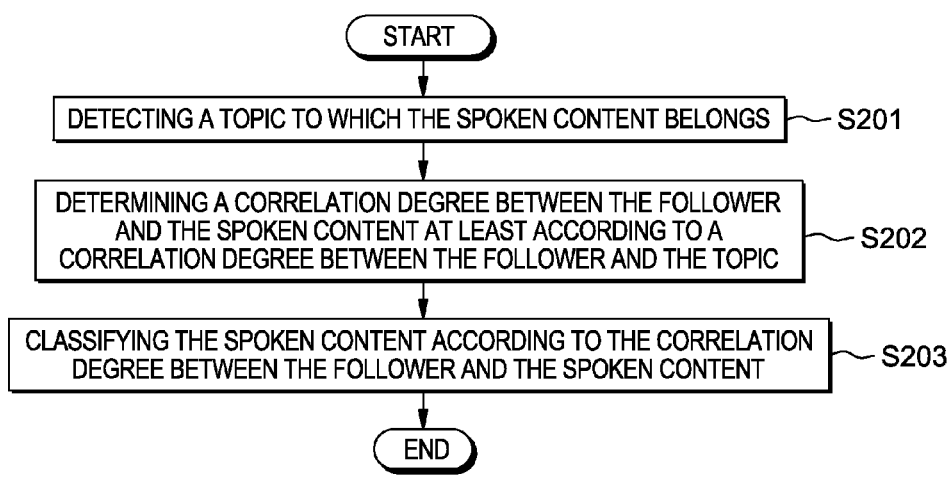
FIG. 2 shows a flow chart of a method for classifying spoken content in a teleconference for a follower of the teleconference according to an embodiment of the present invention.

As shown in FIG. 2, a topic to which the spoken content of the speaker belongs is detected in step S201.

The topic to which the spoken content belongs can be detected through voice recognition and semantic analysis. Specifically, a complete voice corresponding to the spoken content can be extracted, and converted into machine-understandable data through the voice recognition, and then the semantic analysis is performed on the data to determine a specific meaning of the spoken content. Since one or more topics have been preset in the teleconference system, the one or more topics can be acquired from the teleconference system, and then the topic to which the spoken content belongs can be determined according to the specific meaning of the spoken content. For example, when topics "development plan of product A" and "test result of product B" are preset in the teleconference system and it is determined through the semantic analysis that the specific meaning of the spoken content is some defect of the product B found during test, it can be determined that the spoken content belongs to the topic "test result of product B". The voice recognition and the semantic analysis can be performed on the spoken content by using a known method in the art, and a detailed description thereof is omitted here.

Next, a (overall) correlation degree between the follower and the spoken content is determined at least according to a correlation degree (hereinafter referred to a topic correlation degree) between the follower and the topic in step S202. In an implementation, the (overall) correlation degree between the follower and the spoken content can be determined only according to the topic correlation degree. Specifically, in the one or more topics to be discussed during the teleconference, some topics may be relevant to the follower, while others may be irrelevant to the follower. Since the speaker makes his speech under a corresponding topic, the correlation degree between the follower and the topic to which the spoken content belongs, namely, the topic correlation degree, can be taken into consideration when the (overall) correlation degree between the follower and the spoken content is determined.

The topic correlation degree can be determined according to properties of the follower and properties of the topic to which the spoken content belongs. Specifically, the topic correlation degree can be determined by fuzzy matching on the properties of the follower and the properties of the topic. For example, when a topic to be discussed during the teleconference is preset, one or more properties describing the topic can be further provided, such as a property "business type" representing a business type (e.g., sales, R&D, or the like) of the topic, a property "technical field" representing a specific technical field (e.g. Java technology, C++ technology, or the like) of the topic, a property "product" representing a product (e.g. product A, product B, or the like) at which the topic is directed, etc., and a corresponding score can be assigned to each type of properties of the topic and then stored in the database. The score assigned to each type of properties of the topic can be freely set according to actual demands and/or a nature of the property per se, and the scores assigned to different types of properties can be the same or different. For example, a first score can be assigned to a first property (e.g., "business type") of the topic and a second score can be assigned to a second property (e.g., "product") of the topic, and the second score is higher than the first score so as to show that the second property, compared to the first property, is more important in determining the topic correlation degree. The scores assigned to the respective properties of the topic can be integers or percentages. When the topic correlation degree is determined, the correlation degree can be set to an initial value (e.g., 0). Then, the respective properties of the follower can be compared with the respective properties of the topic one by one, so as to determine whether they are the same or relevant. If some property of the follower is the same as or relevant to some property of the topic, it can be determined that the two properties match each other, thereby a score assigned to the property of the topic is added to a current value of the topic correlation degree; otherwise, it can be determined that the two properties do not match each other, and other properties of the follower and the topic are further compared until comparison of all the properties are completed. In this way, the topic correlation degree can be determined by comparing all the properties of the follower and the topic one by one. It is to be noted that the topic correlation degree can be determined at different occasions. Specifically, since all the topics of the teleconference can be known before the teleconference begins, correlation degrees between the follower and the respective topics can be determined in the manner described above before the teleconference begins or before all the participants speak and stored in the database. Thus, when a speaker makes a speech, the topic correlation degree can be retrieved from the respective stored correlation degrees and determined in step S202. Alternatively, the topic correlation degree may be determined in the manner described above in step S202 when the speaker makes a speech. In addition, it is to be understood that the aforesaid fuzzy matching method is exemplary only, not limitative; and different fuzzy matching modes can be adopted according to specific properties of the follower and a nature of the topic per se.

In the implementation, when the (overall) correlation degree between the follower and the spoken content is determined according to the topic correlation degree in step S202, it is possible that the greater the topic correlation degree is, the greater the (overall) correlation degree between the follower and the spoken content is. For example, the topic correlation degree can be used as the (overall) correlation degree between the follower and the spoken content. Or, a product of the topic correlation degree and a weighting coefficient can be used as the (overall) correlation degree between the follower and the spoken content, and the weighting coefficient can be flexibly set according to actual demands.

In another implementation, when the (overall) correlation degree between the follower and the spoken content of the speaker is determined, a time period (i.e., a speaking duration) from a moment at which the speaker delivers the spoken content to a current moment (i.e., a moment at which the (overall) correlation degree between the follower and the spoken content of the speaker is determined) may be considered, in addition to the topic correlation degree. This is because in some teleconferences, a latest spoken content may be more important than spoken contents which have passed for a time period, thus the follower shall pay more attention to the latest spoken content. A time score can be used as a parameter for measuring the time period (speaking duration) from the moment at which the speaker delivers the spoken content to the current moment. For example, a time period from a moment at which the teleconference begins to the current moment can be divided into a plurality of time intervals, and each time interval is assigned a corresponding score as a time score for all spoken contents within the time interval.

The time score can be an integer or a percentage. In the depicted embodiment, the closer the time interval is from the current moment, the smaller the time score assigned to the time interval is. Thus, in step S202, the time period from the moment at which the speaker delivers the spoken content to the current moment can be determined to determine a time interval which the spoken content fall into, thereby determining the time score of the spoken content. In the implementation, when the correlation degree between the current follower and the spoken content is determined according to the topic correlation degree and the time period from the moment at which the spoken content is delivered to the current moment (or the time score of the spoken content), it is possible that the greater the topic correlation degree is or the shorter the time period is (i.e., the lower the time score of the spoken content is), the greater the (overall) correlation degree between the follower and the spoken content is. For example, the correlation degree D between the follower and the spoken content can be calculated by formula (1) as follows:

$$D = D_1/t \quad (1)$$

where $D_1$ denotes the topic correlation degree, and t denotes the time score of the spoken content.

In the formula (1), the topic correlation degree and the time period are considered to be of the same importance. However, in some cases, they can be of different importance for the follower. In such cases, corresponding weights can be applied to the topic correlation degree and the time period, and the (overall) correlation degree between the follower and the spoken content may be calculated according to the topic correlation degree and the time period to which the weights have been applied. For example, the correlation degree D between the follower and the spoken content can be calculated by formula (2) as follows:

$$D = W_1 D_1 / (W_t t) \qquad (2)$$

where $W_1$ is the weight of the topic correlation degree $D_1$, and $W_t$ is the weight of t time score of the spoken content.

In still another implementation, in addition to the topic correlation degree, a correlation degree between the follower and the speaker can be considered when the (overall) correlation degree between the follower and the spoken content of the speaker is determined.

Specifically, the speaker and the follower of the same teleconference are often relevant in a certain way, so that the follower may need to pay attention to the spoken content of the speaker. For example, if the speaker is a leader of the follower or a colleague participating in a same project as the follower, the spoken content of the speaker is usually relevant to the follower, so that the follower may need to pay attention to his spoken content. In addition, the correlation degree between the speaker and the follower may vary in accordance with different relationships between the speaker and the follower. For example, the correlation degree between the speaker and the follower may be higher in a case where the speaker is the leader of the follower, as compared with a case where the speaker is a colleague of the follower and has a job task different from that of the follower. Therefore, the correlation degree between the follower and the speaker (hereinafter referred to as speaker correlation degree) can also be taken into consideration when the (overall) correlation degree between the follower and the spoken content is determined.

The speaker correlation degree can be determined according to properties of the follower and properties of the speaker. In the embodiment, the speaker correlation degree can be determined by fuzzy matching on the properties of the follower and the properties of the speaker. For example, a corresponding score can be assigned to each type of properties of all the participants and the follower of the teleconference in advance, for use when the speaker correlation degree is determined, and the score is stored in the database. The score assigned to each type of properties can be freely set according to actual demands and/or a nature of the property per se, and the scores assigned to different types of properties can be the same or different.

For example, a third score can be assigned to a first property (e.g., "task") of all the participants and the follower, a fourth score can be assigned to a second property (e.g., "company") of all the participants and the follower, and the fourth score is higher than the third score, so as to show that the second property, as compared with the first property, is more important in determining the speaker correlation degree. The scores assigned to the respective properties of all the participants and the follower can be integers or percentages. When the speaker correlation degree is determined, the speaker correlation degree can be set to an initial value (e.g., 0). Then, the same type of properties of the follower and the speaker can be compared one by one, so as to determine whether they comply with a predefined relationship.

If a property of the follower and a property of a same type of the speaker comply with the predefined relationship, it can be determined that the two properties match each other, then the score assigned to such type of properties is added to a current value of the speaker correlation degree. On the contrary, if a property of the follower and a property of the same type of the speaker do not comply with the predefined relationship, it can be determined that the two properties do not match each other, and other properties of the follower and the speaker are further compared until comparison of all the properties are completed.

The predefined relationship can vary in accordance with the type of the properties. For example, for the property "company", the predefined relationship can be "same", namely, if the company indicated by the property "company" of the follower is the same as the company indicated by the property "company" of the speaker, it can be determined that the two properties of the follower and the speaker match each other, then the score assigned to the property "company" is added to the current value of the speaker correlation degree. For the property "job position", the predefined relation can be "managing or managed", namely, if the job position indicated by property "job position" of the follower and the job position indicated by the property "job position" of the speaker are in a managing or managed relationship (for example, a development engineer and a project manager managing the development engineer), it can be determined that the two properties of the follower and the speaker match each other, then a score assigned to the property "job position" is added to the current value of the speaker correlation degree. In this way, the speaker correlation degree can be determined by comparing all the properties of the follower and the speaker one by one and by adding the score assigned to matching properties to the current value of the speaker correlation degree. It is to be noted that the speaker correlation degree can be determined at different occasions. Specifically, since all the participants of the teleconference can be known before the teleconference begins, a correlation degree between the follower and each participant can be determined in the manner described above before the teleconference begins or before all the participants speak, and stored in the database. Thus, when the speaker makes his speech, a needed speaker correlation degree can be retrieved from the respective stored correlation degrees and determined in step S202. Alternatively, the speaker correlation degree may be determined in the manner described above in step S202 when the speaker makes his speech. In addition, it is to be understood that the aforesaid fuzzy matching method is exemplary only, not limitative, and different fuzzy matching modes can be adopted according to specific properties of the follower and the speaker.

In the depicted implementation, in step S202, the speaker of the spoken content may be detected firstly, then the (overall) correlation degree between the follower and the spoken content may be determined according to the speaker correlation degree and the topic correlation degree determined in the above manners.

Specifically, the speaker of the spoken content can be detected through voice recognition. For example, a complete voice or a voice segment of the speaker corresponding to the spoken content can be extracted and compared with all the voice samples stored in the database one by one, so as to find a voice sample matching the voice segment, thereby determining a person corresponding to the voice sample, namely, the speaker of the spoken content. In addition, the (overall) correlation degree between the follower and the spoken content can be determined, so that the greater the speaker correlation degree is or the greater the topic correlation degree is, the greater the (overall) correlation degree between the follower and the spoken content is. For example, the correlation degree D between the follower and the spoken content can be calculated by formula (3) as follows:

$$D=D_1+D_2 \qquad (3)$$

where $D_1$ is the topic correlation degree, and $D_2$ is the speaker correlation degree. Alternatively, the correlation degree D between the follower and the spoken content can be calculated by formula (4) as follows:

$$D=D_1 \times D_2 \qquad (4)$$

In the formulas (3) and (4), the speaker correlation degree and the topic correlation degree are considered to be of the same importance. However, in some cases, they can be of different importance for the follower. For example, the follower may be concerned more about an identity of the speaker as compared with the topic to which the spoken content belongs, that is, no matter what topic to which the spoken content belongs is, the follower pays attention to the spoken content as long as the spoken content comes from a speaker with a specific identity. In this case, the speaker correlation degree shall have a weight greater than that of the topic correlation degree when the (overall) correlation degree between the follower and the spoken content is determined. On the other hand, the follower may be concerned about only the topic to which the spoken content belongs, rather than the speaker whom the spoken content comes from. In this case, the speaker correlation degree shall have a weight lower than that of the topic correlation degree when the (overall) correlation degree between the follower and the spoken content is determined. Therefore, corresponding weights can be applied to the speaker correlation degree and the topic correlation degree, so as to calculate the (overall) correlation degree between the follower and the spoken content according to the speaker correlation degree and the topic correlation degree to which the weight have been applied. Under the circumstance, the correlation degree D between the follower and the spoken content can be calculated by, for example, formula (5) or (6):

$$D=W_1D_1+W_2D_2 \qquad (5)$$

$$D=(W_1D_1) \times (W_2D_2) \qquad (6)$$

where $W_1$ is the weight of the topic correlation degree $D_1$, and $W_2$ is the weight of the speaker correlation degree $D_2$.

In still another implementation, when the (overall) correlation degree between the follower and the spoken content of the speaker is determined, the topic correlation degree, the speaker correlation degree and the time period obtained in the manner described above may be considered. Under such circumstance, the (overall) correlation degree between the follower and the spoken content can be determined, so that the greater the speaker correlation degree is, the greater the topic correlation degree is, or the shorter the time period is (i.e., the lower the time score of the spoken content is), the greater the (overall) correlation degree between the follower and the spoken content is. For example, the correlation degree D between the follower and the spoken content can be calculated by formula (7) as follows:

$$D=(D_1+D_2)/t \qquad (7)$$

where $D_1$ is the topic correlation degree, $D_2$ is the speaker correlation degree and t denotes a time score of the spoken content. Alternatively, the correlation degree D between the follower and the spoken content can be calculated by formula (8) as follows:

$$D=(D_1 \times D_2)/t \qquad (8)$$

Similarly, corresponding weights can be applied to the topic correlation degree, the speaker correlation degree and the time period in accordance with importance thereof, so as to calculate the (overall) correlation degree between the follower and the spoken content according to the speaker correlation degree, the topic correlation degree and the time period to which the weights have been applied. Under such circumstance, the overall correlation degree D between the follower and the spoken content can be calculated by, for example, formula (9) or (10) as follows:

$$D=(W_1D_1+W_2D_2)/(W_t t) \qquad (9)$$

$$D=(W_1D_1) \times (W_2D_2)/(W_t t) \qquad (10)$$

where $W_1$ is the weight of the topic correlation degree $D_1$, $W_2$ is the weight of the speaker correlation degree $D_2$, and $W_t$ is the weight of the time score of the spoken content.

It is to be appreciated that, although different implementations in which the (overall) correlation degree between the follower and the spoken content is determined according to the topic correlation degree, according to the topic correlation degree and the time period, or according to the speaker correlation degree, the topic correlation degree and the time period have been described hereinbefore, they are only exemplary. Actually, the (overall) correlation degree between the follower and the spoken content can be determined according to at least one of the speaker correlation degree, the topic correlation degree and the time period. Under such circumstance, an item corresponding to a parameter which is not used in the above three parameters can be removed, for example, from any one of the formulas (1)-(10). Furthermore, it is to be appreciated that the formulas described above for calculating the correlation degree D are only exemplary, and other formulas may be used to calculate the correlation degree D as required, as long as the formulas render that the greater the speaker correlation degree is, the greater the topic correlation degree is, or the shorter the time period is, the greater the correlation degree D is.

Referring further to FIG. 2, the spoken content can be classified according to the (overall) correlation degree between the follower and the spoken content in step S203.

Specifically, the spoken content may be classified by comparing the (overall) correlation degree between the follower and the spoken content with a preset threshold. For example, a threshold can be set, and the (overall) correlation degree between the follower and the spoken contents can be compared with the threshold; if the (overall) correlation degree between the follower and the spoken content is greater than the threshold, the spoken content can be classified as a content which is relevant to the follower and thus should be paid attention to by the follower, otherwise the spoken content can be classified as a content which is irrelevant to the follower and thus may not be paid attention to by the follower. Alternatively, multiple thresholds which correspond to a plurality of correlation degree levels respectively can be set, and the (overall) correlation degree between the follower and the spoken content may be compared with the respective thresholds, so as to determine the correlation degree level of the spoken content, thus classifying the spoken content according to the correlation degree level.

After completion of the classification, the spoken content can be displayed to the follower in different ways according to the correlation degree level of the spoken content. For example, spoken contents at different correlation degree levels can be displayed in different colors, fonts, sizes or the like. For example, in a case that one threshold is set, a spoken content relevant to the follower can be displayed in red and a spoken content irrelevant to the follower can be shown in black. In a case that a plurality of thresholds are set, the spoken contents at respective correlation degree levels can be displayed in different colors. Thus, the follower can learn the correlation degrees between all the spoken contents and him conveniently and rapidly. Besides the spoken content per se, various information, such as the speaker of spoken content, the moment at which the speaker delivers the spoken content, the topic to which the spoken content belongs, a specific value of the correlation degree between the spoken content and the follower, or the like, can be additionally displayed for the follower's reference.

The method for classifying spoken content in a teleconference for a follower of the teleconference according to the embodiment of the present invention will be described below in conjunction with a particular example.

In the example, it is assumed that three topics, including test status and problems of software product A, test status and problems of software product B and problems related to test environments of software products A and B, are to be discussed during the teleconference, and participants of the teleconference include Mark, Scott, Tom, Connie, Kerry, Jerry and Jan, whose job positions are shown in Table 1 below (herein, specific properties of the respective participants will be omitted here for simplicity):

TABLE 1

| Participant | Job position |
| --- | --- |
| Mark | Tester for product A |
| Scott | Developer for product A |
| Tom | Developer for product B |
| Connie | Developer for product B |
| Kerry | Administrator of test environments used by all testers |
| Jerry | First line manager of Mark |
| Jan | Project manager of products A and B |

It may be seen that different participants may pay attention to different topics. Specifically, Mark, Scott and Jerry generally may pay more attention to the topic "test status and problems of software product A", Tom and Connie will pay more attention to the topic "test status and problems of software product B", and Kerry and Jan will pay attention to all of the three topics.

Take the participant, Mark, as an example of the follower, and assume that a correlation degree between Mark and the spoken content is determined according to a correlation degree between Mark and a speaker, a correlation degree between Mark and a topic to which the spoken content belongs, and a time period from a moment at which the speaker delivers the spoken contents to a current moment.

Before the teleconference begins, a correlation degree between Mark and each of the other participants and a correlation degree between Mark and each topic can be calculated in advance in the manner described above, and stored in the database.

After the teleconference begins, when a participant makes a speech, the speaker and the topic to which the spoken content of the speaker belongs can be detected in the manner described above. Then, the correlation degree between Mark and the speaker and the correlation degree between Mark and the topic can be selected from the stored correlation degrees. Next, the correlation degree between Mark and the spoken content can be determined in the manner described above according to the correlation degree between Mark and the speaker, the correlation degree between Mark and the topic and the time period from the moment at which the speaker delivers the spoken content to the current moment. In the example, it is assumed that the correlation degree between Mark and the spoken content is represented as a percentage between 0% and 100%. Then, the spoken content can be classified according to the correlation degree between Mark and the spoken content, and can be displayed to Mark in the manner described above. In the example, it is assumed that four thresholds, namely, 20%, 40%, 60% and 80%, are set. When the spoken content is classified, the correlation degree between Mark and the spoken content can be compared with the four thresholds, so as to determine its correlation degree level. Then, spoken contents at different correlation degree levels can be displayed in different sizes. FIG. 3 shows an example of classifying the spoken contents during the teleconference and displaying the classified spoken contents in different sizes. In addition, the topic to which each spoken content belongs, the speaker of each spoken content, a specific value of the correlation degree between each spoken content and Mark, and time at which each spoken content is delivered can be displayed, as shown in FIG. 3.

In this way, with the above method according to the embodiment of the present invention, all the spoken contents occurring during the teleconference can be recorded and displayed on a terminal of the follower of the teleconference without missing them. In addition, because the spoken contents may be classified according to the correlation degrees between these spoken contents and the follower, and the spoken contents at different correlation degree levels are displayed in different ways, the follower of the teleconference can learn the correlation degree between each spoken content and him conveniently and quickly, so as to select to pay attention to or not to pay attention to the spoken content, which reduces a burden of the follower and improves conference efficiency.

Hereinafter, an apparatus for classifying spoken content in a teleconference for a follower of the teleconference according to an embodiment of the present invention is described with reference to FIG. 4. As described above, the follower may be a participant of the teleconference or any other person who is interested in the teleconference. The apparatus can be arranged in a teleconference system, for example, in a terminal of the follower, and can execute the method described above. Since main details of operations performed by the apparatus are the same as the above method for classifying spoken content in the teleconference, merely a brief description of the apparatus is given here for simplicity, and a description of the same content is omitted.

As shown in FIG. 4, the apparatus 400 for classifying the spoken content in the teleconference for the follower of the teleconference according to the embodiment of the present invention may include a detecting device 401, a correlation degree determining device 402 and a classifying device 403.

The detecting device 401 can detect whether there is a person making a speech after the teleconference begins. After detecting that the person is making a speech, i.e., after detecting that there is a spoken content, the detecting device 401 can detect a topic to which the spoken content belongs. For example, the detecting device can detect the topic to which the spoken content belongs through voice recognition and semantic analysis. In addition, the detecting device 401 can detect a moment at which the speaker delivers the spoken content, so as to determine a time period from the moment to a current moment. Furthermore, the detecting device 401 can detect the speaker of the spoken content. For example, the detecting device 401 can detect the speaker through voice recognition. The detecting device 401 can conduct such detection in the manner described above with respect to FIG. 2, and a detailed description thereof is omitted here.

The correlation degree determining device 402 can determine a (overall) correlation degree between the follower and the spoken content at least according to a correlation degree between the follower and the topic (hereinafter referred to as topic correlation degree).

In an implementation, the correlation degree determining device 402 can determine the (overall) correlation degree between the follower and the spoken content only according to the topic correlation degree. For example, the correlation degree determining device 402 can determine the (overall) correlation degree between the follower and the spoken content, so that the greater the topic correlation degree is, the greater the (overall) correlation degree between the follower and the spoken content is.

Specifically, the correlation degree determining device 402 can determine the topic correlation degree according to properties of the follower and properties of the topic to which the spoken content belongs. For example, the correlation degree determining device 402 can determine the topic correlation degree through fuzzy matching on the properties of the follower and the properties of the topic. The correlation degree determining device 402 can determine a correlation degree between the follower and each topic in the manner described above before the teleconference begins or all the participants make speeches, and store the correlation degree in the database. Thus, when the speaker makes his speech, the correlation degree determining device 402 can retrieve and determine the topic correlation degree from the respective stored correlation degrees. Alternatively, the correlation degree determining device 402 can determine the topic correlation degree in the manner described above when the speaker makes his speech. Then, the correlation degree determining device 402 can determine the (overall) correlation degree between the follower and the spoken content according to the topic correlation degree in the manner described above.

In another implementation, the correlation degree determining device 402 can determine the (overall) correlation degree between the follower and the spoken content further according to the time period from the moment at which the speaker delivers the spoken content to the current moment (i.e., the moment at which the (overall) correlation degree between the follower and the spoken content of the speaker is determined), besides the topic correlation degree. For example, the correlation degree determining device 402 can determine the (overall) correlation degree between the follower and the spoken content, so that the greater the topic correlation degree is or the shorter the time period is, the greater the (overall) correlation degree between the follower and the spoken content is.

Specifically, the correlation degree determining device 402 can determine a time score of the spoken content according to the time period from the moment at which the speaker delivers the spoken content to the current moment. Then, the correlation degree determining device 402 can determine the (overall) correlation degree between the follower and the spoken content according to the topic correlation degree and the time period in the manner described above, e.g., by formula (1). Alternatively, the correlation degree determining device 402 may apply corresponding weights to the topic correlation degree and the time period, and determine the (overall) correlation degree between the follower and the spoken content according to the topic correlation degree and the time period to which the weights have been applied in the manner described above, e.g., by formula (2).

In still another implementation, the correlation degree determining device 402 can determine the (overall) correlation degree between the follower and the spoken content further according to a correlation degree between the follower and the speaker (hereinafter referred to as speaker correlation degree), besides the topic correlation degree. For example, the correlation degree determining device 402 can determine the (overall) correlation degree between the follower and the spoken content, so that the greater the topic correlation degree is or the greater the speaker correlation degree is, the greater the (overall) correlation degree between the follower and the spoken content is.

Specifically, the correlation degree determining device 402 can determine the speaker correlation degree according to properties of the follower and properties of the speaker. For example, the correlation degree determining device 402 can determine the speaker correlation degree through fuzzy matching on the properties of the follower and the properties of the speaker in the manner described above. The correlation degree determining device 402 can determine a correlation degree between the follower and each participant in the manner described above before the teleconference begins or all the participants make speeches, and store the correlation degree in the database. Thus, the correlation degree determining device 402 can retrieve and determine the speaker correlation degree search from the respective stored correlation degrees when the speaker makes his speech. Alternatively, the correlation degree determining device 402 can determine the speaker correlation degree in the manner described above when the speaker makes his speech. Then, the correlation degree determining device 402 can determine the (overall) correlation degree between the follower and the spoken content according to the speaker correlation degree and the topic correlation degree in the manner described above. Alternatively, the correlation degree determining device 402 can apply corresponding weights to the speaker correlation degree and the topic correlation degree, and determine the (overall) correlation degree between the follower and the spoken content according to the speaker correlation degree and the topic correlation degree to which the weights have been applied in the manner described above.

In still another implementation, the correlation degree determining device 402 can determine the (overall) correlation degree between the follower and the spoken content according to the topic correlation degree, the speaker correlation degree and the time period. For example, the correlation degree determining device 402 can determine the (overall) correlation degree between the follower and the spoken content, so that the greater the topic correlation degree is, the shorter the time period is, or the greater the speaker correlation degree is, the greater the (overall) correlation degree between the follower and the spoken content is. In this implementation, the correlation degree determining device 402 can determine the (overall) correlation degree between the follower and the spoken content in the manner described above, and a description thereof is omitted here.

It is to be appreciated that the correlation degree determining device 402 actually can determine the (overall) correlation degree between the follower and the spoken content according to at least one of the speaker correlation degree, the topic correlation degree and the time period, as described above.

The classifying device 403 can classify the spoken content according to the determined (overall) correlation degree between the follower and the spoken content. Specifically, the classifying device 403 can classify the spoken content by comparing the (overall) correlation degree between the follower and the spoken content with one or more preset thresholds to determine a correlation degree level of the spoken content. Then, the classifying device 403 can display the spoken content to the follower in different ways according to the correlation degree level of the spoken content, as described above.

Therefore, with the above apparatus according to the embodiment of the present invention, all the spoken contents during the teleconference can be recorded and displayed, so that the follower of the teleconference can view all the spoken contents, even though the spoken contents have passed for a time period. In addition, the spoken contents can be classified according to the correlation degrees between the spoken contents and the follower, so that the follower can learn easily the correlation degrees between the spoken contents and him, and thus may pay attention to only contents which are relevant to him or which he is interested in and ignore contents which are irrelevant to him, which reduces a burden of the follower.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for classifying spoken content in a teleconference for a follower of the teleconference, the method comprising:

detecting, via voice recognition and semantic analysis executed by one or more processors, a topic to which the spoken content belongs;

determining, by the one or more processors, a correlation degree between the follower and the topic to provide a topic correlation degree;

determining, by the one or more processors, a correlation degree between the topic and the spoken content to provide a speaker correlation degree;

classifying, by the one or more processors, the spoken content into a plurality of correlation degree levels according to an overall correlation degree that is a weighted sum of the topic correlation degree and the speaker correlation degree divided by an elapsed time since the spoken content was spoken; and displaying the spoken content according to the plurality of correlation degree levels.

2. The method of claim 1, wherein the topic correlation degree is calculated prior to the teleconference according to properties of the follower and properties of the topic.

3. The method of claim 1, wherein the topic correlation degree is determined by fuzzy matching on properties of the follower and properties of the topic.

4. The method of claim 1, wherein the topic correlation degree is determined by determining if each of a plurality of properties of the topic matches one or more properties of the follower and adding a property score to the topic correlation degree in response to a match of a property.

5. The method of claim 1, wherein the correlation degree determining module determines the topic correlation degree by determining if each of a plurality of properties of the topic matches one or more properties of the follower and adding a property score to the topic correlation degree in response to a match of a property.

6. A computer program product for classifying spoken content in a teleconference for a follower of the teleconference, the computer program product comprising:

at least one non-transitory computer readable storage medium, and program instructions stored on the at least one non-transitory computer readable storage medium, the program instructions comprising instructions to:

detect, via voice recognition and semantic analysis executed by one or more processors, a topic to which the spoken content belongs;

determine, by the one or more processors, a correlation degree between the follower and the topic to provide a topic correlation degree;

determine, by the one or more processors, a correlation degree between the topic and the spoken content to provide a speaker correlation degree;

classify, by the one or more processors, the spoken content into a plurality of correlation degree levels according to an overall correlation degree that is a weighted sum of the topic correlation degree and the speaker correlation degree divided by an elapsed time since the spoken content was spoken; and display the spoken content according to the plurality of correlation degree levels.

7. The computer program product of claim 6, wherein the topic correlation degree is calculated prior to the teleconference according to properties of the follower and properties of the topic.

8. The computer program product of claim 6, wherein the program instructions comprising instructions to determine the topic correlation degree by fuzzy matching on properties of the follower and properties of the topic.

9. The computer program product of claim 6, wherein the program instructions comprising instructions to determine the topic correlation degree by determining if each of a plurality of properties of the topic matches one or more properties of the follower and adding a property score to the topic correlation degree in response to a match of a property.

10. An apparatus for classifying spoken content in a teleconference for a follower of the teleconference, comprising:

one or more processors;

a plurality of program modules executed by the one or more processors including a detecting module, a correlation degree determining module, and a classifying module;

the detecting module configured to detect, via voice recognition and semantic analysis, a topic to which the spoken content belongs;

the correlation degree determining module configured to determine a correlation degree between the follower and the topic to provide a topic correlation degree;

the correlation degree determining module further configured to determine a correlation degree between the topic and the spoken content to provide a speaker correlation degree;

the classifying module configured to classify the spoken content into a plurality of correlation degree levels according to an overall correlation degree that is a weighted sum of the topic correlation degree and the speaker correlation degree divided by an elapsed time since the spoken content was spoken; and the classifying module further configured to display the spoken content according to the plurality of correlation degree levels.

11. The apparatus of claim 10, wherein the topic correlation degree is calculated prior to the teleconference according to properties of the follower and properties of the topic.

12. The apparatus of claim 10, wherein the correlation degree determining module determines the topic correlation degree by fuzzy matching on properties of the follower and properties of the topic.

* * * * *